(12) United States Patent
Wu et al.

(10) Patent No.: US 10,237,547 B1
(45) Date of Patent: Mar. 19, 2019

(54) METHOD FOR TESTING ENERGY EFFICIENCY OF DISPLAY DEVICE

(71) Applicant: Top Victory Investments Ltd., Kowloon (HK)

(72) Inventors: Ethan Wu, New Taipei (TW); Victor Chang, New Taipei (TW)

(73) Assignee: Top Victory Investments Ltd., Kowloon (HK)

( * ) Notice: Subject to any disclaimer, the term of this patent is extended or adjusted under 35 U.S.C. 154(b) by 0 days.

(21) Appl. No.: 15/950,229

(22) Filed: Apr. 11, 2018

(51) Int. Cl.
  *H04N 17/00* (2006.01)
  *H04N 5/58* (2006.01)
  *H04N 5/63* (2006.01)
  *H04N 17/04* (2006.01)

(52) U.S. Cl.
  CPC ............. *H04N 17/045* (2013.01); *H04N 5/58* (2013.01); *H04N 5/63* (2013.01)

(58) Field of Classification Search
  CPC .......... H04N 17/045; H04N 5/58; H04N 5/63; H04N 17/04; H04N 17/00; H04N 5/20; H04N 5/40; H04N 5/57; G09G 3/3406; G09G 2320/0646; G09G 2360/16; G06T 5/40; G06T 5/001

USPC ....... 348/177, 180, 671, 672, 678, 679, 687, 348/688, 730; 345/102; 382/168, 169, 382/274
  See application file for complete search history.

(56) References Cited

U.S. PATENT DOCUMENTS

| | | | |
|---|---|---|---|
| 2011/0032430 A1* | 2/2011 | Prieto | G09G 3/3406 348/687 |
| 2011/0261263 A1* | 10/2011 | Schoenfeld | G02F 1/133603 348/687 |
| 2012/0327303 A1* | 12/2012 | Sun | G09G 3/3406 348/687 |

\* cited by examiner

*Primary Examiner* — Sherrie Hsia
(74) *Attorney, Agent, or Firm* — Alan D. Kamrath; Kamrath IP Lawfirm, P.A.

(57) ABSTRACT

A method for testing energy efficiency of a display device having automatic brightness control (ABC) and local dimming functions includes the following steps: S1: executing an estimation program to obtain an estimation value of on-mode average power consumption of the display device; S2: when the estimation value is greater than or equal to a threshold value, adjusting a turn-on preset brightness value, first brightness adjustment ratios, and/or second brightness adjustment ratios to cause the estimation value to be less than the threshold value; and, S3: when the estimation value is less than the threshold value, actually measuring the display device to obtain a measurement value of the on-mode average power consumption of the display device.

8 Claims, 3 Drawing Sheets

METHOD FOR TESTING ENERGY EFFICIENCY OF DISPLAY DEVICE

BACKGROUND OF THE INVENTION

1. Field of the Invention

The present invention relates to a method for testing energy efficiency of a display device and, more particularly, to a method for testing energy efficiency about on-mode average power consumption of a display device having an automatic brightness control (ABC) function.

2. Description of the Prior Art

Display devices, for example televisions, are widely used electrical appliances. To enhance the energy efficiency of display devices is good for energy saving and carbon emission reduction. U.S. Energy Star program, Taiwan Energy Label program, etc., provide energy efficiency specifications for televisions and methods for testing energy efficiency thereof. The energy efficiency specification of the television generally includes on-mode average power consumption and standby-passive mode average power consumption. Taking Energy Star program as an example, the on-mode average power consumption of the television shall be less than or equal to the maximum allowable on-mode average power consumption $P_{ON\_MAX}$ given by $$P_{ON\_MAX}=78.5\times\tanh[0.0005\times(A-140)+0.038]+14,$$

where $P_{ON\_MAX}$ is in watts (W), and A is the viewable screen area of the television in square inches. The standby-passive mode average power consumption of the television shall be less than or equal to 0.5 W.

Taking the television having the ABC function as an example, a method for testing energy efficiency about on-mode average power consumption thereof includes: turning on the television and enabling the ABC function to activate an ambient light sensor; after the television reaches a steady state, playing a test video on television, and then using a light source to respectively simulate ambient light levels of 3, 12, 35, and 100 lux incident to the ambient light sensor for a test time of 10 minutes to respectively measure power consumptions $P_3$, $P_{12}$, $P_{35}$, and $P_{100}$; and, calculating the on-mode average power consumption $P_{ON}=(P_3+P_{12}+P_{35}+P_{100})/4$. It takes more than 40 minutes to perform the testing process once. Moreover, when the on-mode average power consumption $P_{ON}$ is greater than the maximum allowable on-mode average power consumption $P_{ON\_MAX}$, meaning that the testing result fails to meet the specification requirement, so settings (e.g. brightness adjustment ratios corresponding to the ambient light levels) of the television need to be adjusted, and then the above testing process is repeatedly performed until the testing result meets the specification requirement. Obviously, the conventional method for testing energy efficiency about the on-mode average power consumption of the television takes too much time.

SUMMARY OF THE INVENTION

The present invention provides a method for testing energy efficiency of a display device in order to save time and improve work efficiency.

According to an aspect of the present invention, there is provided a method for testing energy efficiency of a display device, the display device having an ABC function and a local dimming function, the method including the following steps:

S1: executing an estimation program to obtain an estimation value of an on-mode average power consumption of the display device, including the following steps:

S11: analyzing contents of a test video to obtain an average-pixel-value histogram of frames of the test video in a test time, the average-pixel-value histogram including average-pixel-value bins, the frames being categorized into the average-pixel-value bins according to their respective average pixel values, so that the average-pixel-value bins correspond to frame numbers respectively;

S12: setting a turn-on preset brightness value, first brightness adjustment ratios corresponding to ambient light levels, and second brightness adjustment ratios corresponding to the average-pixel-value bins of the display device;

S13: according to a rated backlight power consumption value, the turn-on preset brightness value, and the first brightness adjustment ratios of the display device, calculating maximum backlight power consumption values corresponding to the ambient light levels;

S14: according to the maximum backlight power consumption values, the frame numbers, and the second brightness adjustment ratios, calculating average backlight power consumption values corresponding to the ambient light levels; and S15: according to an average value of the average backlight power consumption values, and a rated motherboard power consumption value of the display device, calculating the estimation value;

S2: when the estimation value is greater than or equal to a threshold value, adjusting the turn-on preset brightness value, the first brightness adjustment ratios, and/or the second brightness adjustment ratios to cause the estimation value to be less than the threshold value; and S3: when the estimation value is less than the threshold value, actually measuring the display device to obtain a measurement value of the on-mode average power consumption of the display device.

In sum, the estimation program is executed to analyze the contents of the test video to obtain the average-pixel-value histogram (including the average-pixel-value bins and the frame numbers corresponding thereto), and calculate the estimation value of the on-mode average power consumption of the display device by setting the turn-on preset brightness value, the first brightness adjustment ratios corresponding to the ambient light levels, and the second brightness adjustment ratios corresponding to the average-pixel-value bins. The turn-on preset brightness value, the first brightness adjustment ratios, and/or the second brightness adjustment ratios may be repeatedly adjusted to cause the estimation value to be less than the threshold value. After that, the display device is actually measured to obtain the measurement value of the on-mode average power consumption of the display device, so that it may save time and improve work efficiency.

The above and other objectives, features, and advantages of the present invention will be better understood from the following detailed description of the preferred embodiments of the present invention that are illustrated in the accompanying drawings.

DESCRIPTION OF THE PREFERRED EMBODIMENTS

Figure 1:
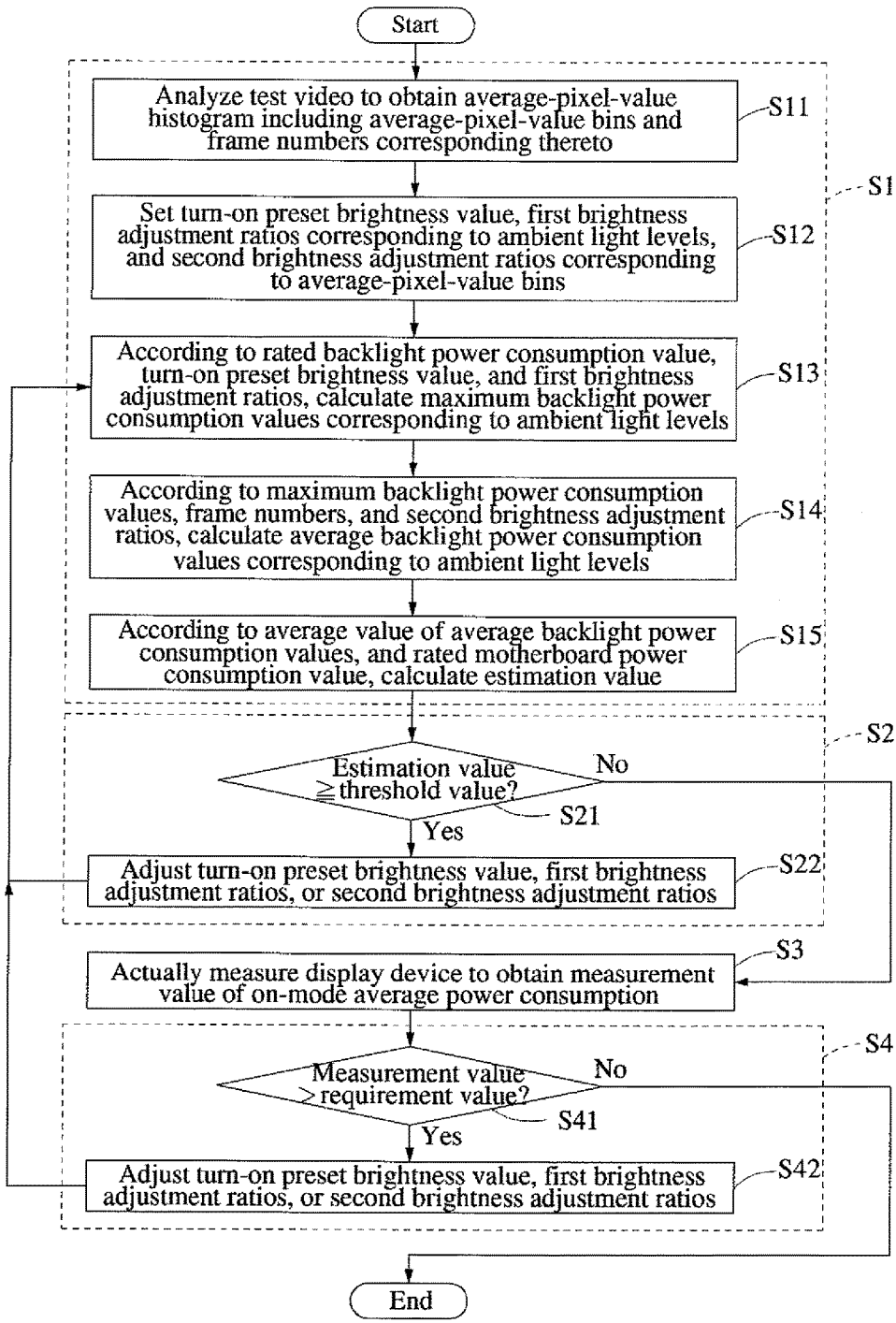
FIG. 1 is a flowchart of a method for testing energy efficiency of a display device according to an embodiment of the present invention.

Please refer to FIG. 1. FIG. 1 is a flowchart of a method for testing energy efficiency of a display device according to an embodiment of the present invention. The display device is, for example, a television. The display device has an ABC function and a local dimming function. The ABC function is used to, when an ambient light sensor of the display device detects the ambient light level is lower, decrease frame brightness of the display device; when the ambient light sensor detects the ambient light level is higher, increase frame brightness of the display device, so that it may save energy. The local dimming function is used to, according to contents of video to be played on television, provide lower backlight brightness for darker areas on the frame, and higher backlight brightness for brighter areas on the frame, so it may increase a dynamic contrast ratio of the frame.

The method for testing energy efficiency of the display device includes step S1. At the step S1, an estimation program is executed to obtain an estimation value $P_{ON\_E}$ of on-mode average power consumption of the display device. In the embodiment, the step S1 includes steps S11 to S15.

At the step S11, the estimation program analyzes contents of a test video to obtain an average-pixel-value histogram of k frames of the test video in a test time, where k is a positive integer. The average-pixel-value histogram includes m average-pixel-value bins, where m is a positive integer. The k frames are categorized into the m average-pixel-value bins according to their respective average pixel values, so that the m average-pixel-value bins correspond to m frame numbers $N_1, N_2, \ldots, N_m$ respectively, where $N_1+N_2+\ldots+N_m=k$, and $N_1, N_2, \ldots, N_m$ are nonnegative integers.

At the step S12, in the estimation program, a turn-on preset brightness value U, n first brightness adjustment ratios. $S_1, S_2, \ldots, S_n$ corresponding to n ambient light levels, and m second brightness adjustment ratios $D_1, D_2, \ldots, D_m$ corresponding to the m average-pixel-value bins of the display device are set, where n is a positive integer, and U, $S_1, S_2, \ldots, S_n, D_1, D_2, \ldots, D_m$ each are 0 to 100% (or 0 to 1). The n ambient light levels are, for example, 3, 12, 35, and 100 lux. It should be noted that the n first brightness adjustment ratios $S_1, S_2, \ldots, S_n$ correspond to the n ambient light levels arranged in ascending order, i.e. from the lowest to the highest illuminance; the m second brightness adjustment ratios $D_1, D_2, \ldots, D_m$ correspond to the m average-pixel-value bins arranged in ascending order, i.e. from the lowest to the highest average pixel value. For the sake of overall frame smoothness, it needs to maintain $S_1 \leq S_2 \leq \ldots \leq S_n$, and $D_1 \leq D_2 \leq \ldots \leq D_m$ while setting or adjusting the first and second brightness adjustment ratios.

At the step S13, according to a rated backlight power consumption value $P_{BL}$, the turn-on preset brightness value U, and the n first brightness adjustment ratios $S_1, S_2, \ldots, S_n$, the estimation program calculates n maximum backlight power consumption values $P_{BLM1}, P_{BLM2}, \ldots, P_{BLMn}$ corresponding to the n ambient light levels, given by $$P_{BLMi} = P_{BL} \times U \times S_i,$$

where i is a positive integer from 1 to n. The rated backlight power consumption value $P_{BL}$ is the power consumption at the time of the frame brightness of the display device being the highest brightness. The rated backlight power consumption value $P_{BL}$ is a fixed value and may be generally obtained from the specification of the display device.

At the step S14, according to the n maximum backlight power consumption values $P_{BLM1}, P_{BLM2}, \ldots, P_{BLMn}$, the m frame numbers $N_1, N_2, \ldots, N_m$, and the m second brightness adjustment ratios $D_1, D_2, \ldots, D_m$, the estimation program calculates n average backlight power consumption values $P_{BLA1}, P_{BLA2}, \ldots, P_{BLAn}$ corresponding to the n ambient light levels, given by $$P_{BLAi} = P_{BLMi} \times \left[ \sum_{j=1}^{m} (N_j \times D_j) \Big/ \sum_{j=1}^{m} N_j \right]$$

$$= P_{BLMi} \times [(N_1 \times D_1 + N_2 \times D_2 + \ldots + N_m \times D_m) / (N_1 + N_2 + \ldots + N_m)],$$

where i is a positive integer from 1 to n. Generally speaking, the higher the ambient light level is, the higher the frame brightness of the display device needs, so the larger the maximum backlight power consumption values needs. Under the condition of the same ambient light level (i.e. the same maximum backlight power consumption value), the larger the average pixel value of the frame content is, the brighter the overall frame is, so the larger the average backlight power consumption value needs. Briefly speaking, the ambient light level determines the maximum value of backlight brightness (or power consumption) of the display device, and the frame content of the display device determines how much backlight brightness (or power consumption) the display device produces within the maximum value.

At the step S15, according to an average value of the average backlight power consumption values $P_{BLA1}, P_{BLA2}, \ldots, P_{BLAn}$, and a rated motherboard power consumption value $P_{MB}$ of the display device, the estimation program calculates the estimation value $P_{ON\_E}$ given by $$P_{ON\_E}=(P_{BLA1}+P_{BLA2}+\ldots+P_{BLAn})/n+P_{MB}.$$

The rated motherboard power consumption value $P_{MB}$ is all fixed power consumption produced from, for example, a motherboard, a timing controller (commonly known as T-CON), a loudspeaker, universal serial bus (USB) or other connector, etc. in the display device, and may be generally obtained from the specification of the display device.

The method for testing energy efficiency of the display device further includes steps S2 and S3. At the step S2, when the estimation program determines that the estimation value $P_{ON\_E}$ is greater than or equal to a threshold value, it adjusts the turn-on preset brightness value U, the n first brightness adjustment ratios $S_1, S_2, \ldots, S_n$, and/or the m second brightness adjustment ratios $D_1, D_2, \ldots, D_m$, to cause the estimation value $P_{ON\_E}$ to be less than the threshold value. At the step S3, when the estimation program determines that the estimation value $P_{ON\_E}$ is less than the threshold value, the display device may be actually measured to obtain a measurement value $P_{ON}$ of the on-mode average power consumption of the display device. In the embodiment, the step S2 includes steps S21 and S22.

At the step S21, the estimation program determines whether the estimation value $P_{ON\_E}$ is greater than or equal to the threshold value. When the estimation program determines that the estimation value $P_{ON\_E}$ is greater than or equal to the threshold value, it executes the step S22, i.e. it adjusts the turn-on preset brightness value U, the n first brightness adjustment ratios $S_1, S_2, \ldots, S_n$, and/or the m second brightness adjustment ratios $D_1, D_2, \ldots, D_m$, and then returns to the step S13 to execute the steps S13 to S15 again to obtain the reduced estimation value $P_{ON\_E}$. When the estimation program determines that the estimation value $P_{ON\_E}$ is less than the threshold value, the step S3 is executed, i.e. the display device may be actually measured to obtain the measurement value $P_{ON}$ of the on-mode average power consumption of the display device.

The method for testing energy efficiency of the display device further includes step S4. At the step S4, when the estimation program determines that the measurement value $P_{ON}$ is greater than a requirement value $P_{ON\_MAX}$ (i.e. the maximum allowable on-mode average power consumption) of the on-mode average power consumption of the display device, it adjusts the turn-on preset brightness value U, the n first brightness adjustment ratios $S_1, S_2, \ldots, S_n$, and/or the m second brightness adjustment ratios $D_1, D_2, \ldots, D_m$ to cause the measurement value $P_{ON}$ to be less than or equal to the requirement value $P_{ON\_MAX}$. In the embodiment, the step S4 includes steps S41 and S42.

At the step S41, the estimation program determines whether the measurement value $P_{ON}$ is greater than the requirement value $P_{ON\_MAX}$. When the estimation program determines that the measurement value $P_{ON}$ is greater than the requirement value $P_{ON\_MAX}$, it executes the step S42, i.e. it adjusts the turn-on preset brightness value U, the n first brightness adjustment ratios $S_1, S_2, \ldots, S_n$, and/or the m second brightness adjustment ratios $D_1, D_2, \ldots, D_m$, and then returns to the step S13 to execute the steps S13 to S15, S2, and S3 again to obtain the reduced measurement value $P_{ON}$. When the estimation program determines that the measurement value $P_{ON}$ is less than or equal to the requirement value $P_{ON\_MAX}$, it ends the testing process.

In the design, the threshold value must be less than or equal to the requirement value $P_{ON\_MAX}$. When the difference of the threshold value and the requirement value $P_{ON\_MAX}$ is bigger, the difference of the estimation value $P_{ON\_E}$ and the requirement value $P_{ON\_MAX}$ is bigger, resulting that even if the measurement value $P_{ON}$ is slightly different from the estimation value $P_{ON\_E}$, the measurement value $P_{ON}$ is still less than or equal to the requirement value $P_{ON\_MAX}$. Therefore, by using a good threshold value to obtain an appropriate difference of the threshold value and the requirement value $P_{ON\_MAX}$, it avoids executing the step S42, i.e. it avoids actually measuring the measurement value $P_{ON}$ of the display device to save time.

In the following description, some steps in the method for testing energy efficiency of the display device shown in FIG. 1 are exemplified by actual values, but these are only examples but not limited to the present invention.

Figure 2:
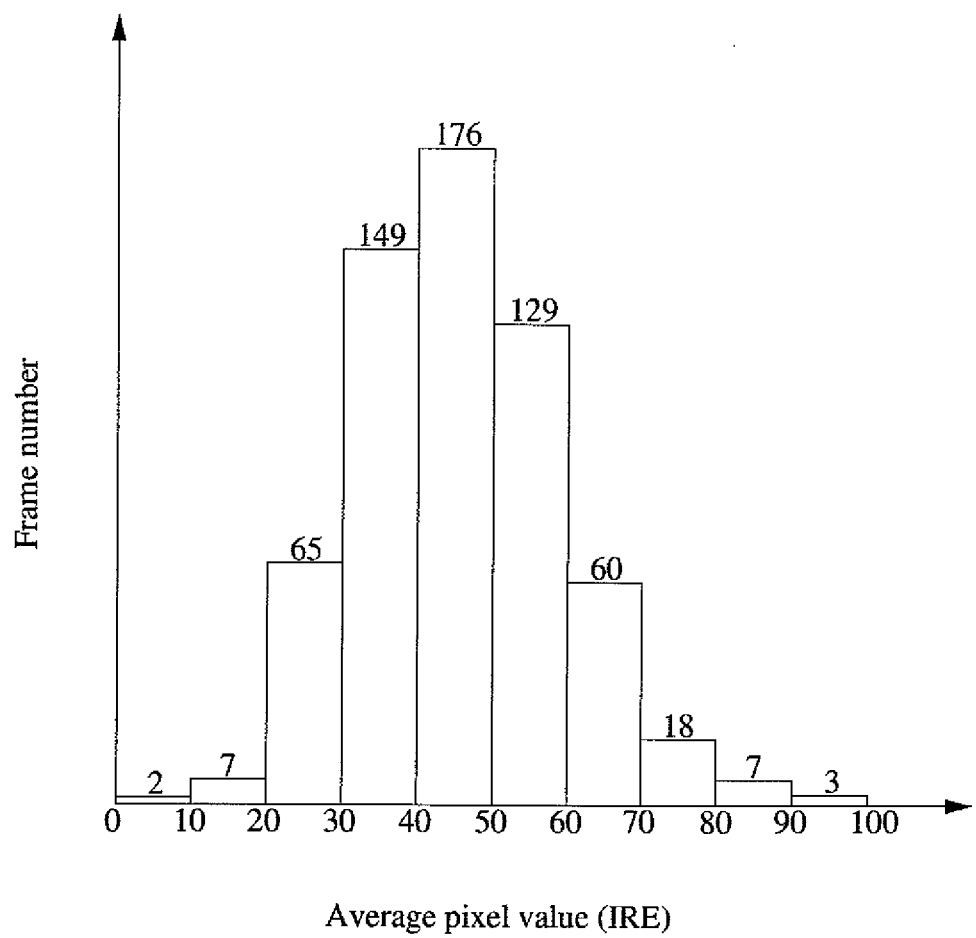
FIG. 2 is a diagram of an average-pixel-value histogram of frames according to an embodiment of the present invention.

At the step S11, the test time may be 10 minutes. The test video may have 616 frames in the test time of 10 minutes. The arithmetic mean of pixel values of all pixels of each frame is an average pixel value, so the average pixel values of the 616 frames constructs an average-pixel-value histogram, for example, shown in FIG. 2. In the average-pixel-value histogram shown in FIG. 2, the entire range of the average pixel values (i.e. 0 to 100 IRE) is divided into 10 equal average-pixel-value bins (i.e. 0 to 10 IRE, 10 to 20 IRE, 20 to 30 IRE, . . . , 90 to 100 IRE), and then the 616 frames are categorized into the 10 average-pixel-value bins according to their respective average pixel values, so that the 10 average-pixel-value bins correspond to 10 frame numbers $N_1, N_2, \ldots, N_{10}$ respectively, where $N_1+N_2+\ldots+N_m=616$. In the embodiment, the 10 frame numbers $N_1, N_2, \ldots N_{10}$ are 2, 7, 65, 149, 176, 129, 60, 18, 7, 3 respectively. In other words, in the 616 frames, there are 2 frames whose average pixel value ranging from 0 to 10 IRE; there are 7 frames whose average pixel value ranging from 10 to 20 IRE; there are 65 frames whose average pixel value ranging from 20 to 30 IRE; there are 149 frames whose average pixel value ranging from 30 to 40 IRE; and so on.

At the step S12, the turn-on preset brightness value U may be set to 80%, meaning that after the television is turned on, the frame brightness is 80% of the maximum brightness. The ambient light levels may include 3, 12, 35, and 100 lux, and the 4 first brightness adjustment ratios $S_1, S_2, \ldots, S_4$ corresponding to the 4 ambient light levels may be set to 40%, 50%, 60%, 70% respectively, meaning that after the ABC function is enabled, when the ambient light sensor detects that the ambient light level is, for example, of 12 lux, the frame brightness is further decreased to 50% thereof, so the frame brightness becomes 80%×50%. The average-pixel-value bins may include 10 average-pixel-value bins (0 to 10 IRE, 10 to 20 IRE, 20 to 30 IRE, . . . , 90 to 100 IRE) shown in FIG. 2, and the 10 second brightness adjustment ratios $D_1, D_2, \ldots, D_{10}$ corresponding to the 10 average-pixel-value bins may be set to 50%, 60%, 70%, 80%, 90%, 100%, 100%, 100%, 100%, 100% respectively, meaning that after the local dimming function is enabled, when the average pixel value of the playing frame is, for example, 10 to 20 IRE (overall frame is darker), the frame brightness is further decreased to 60% thereof, so the frame brightness becomes 80%×50%×60%; when the average pixel value of the playing frame is greater than 50 IRE (overall frame is brighter), the frame brightness is further decreased to 100% thereof, so the frame brightness becomes 80%×50%×100%.

At the step S13, the maximum backlight power consumption values $P_{BLM1}, P_{BLM2}, \ldots, P_{BLM4}$ corresponding to the ambient light levels of 3, 12, 35, 100 lux are given by $$P_{BLM1}=P_{BL}\times U\times S_1=P_{BL}\times 80\%\times 40\%,$$

$$P_{BLM2}=P_{BL}\times U\times S_2=P_{BL}\times 80\%\times 50\%,$$

$$P_{BLM3}=P_{BL}\times U\times S_3=P_{BL}\times 80\%\times 60\%,$$

$$P_{BLM4}=P_{BL}\times U\times S_4=P_{BL}\times 80\%\times 70\%.$$

At the step S14, the average backlight power consumption values $P_{BLA1}, P_{BLA2}, \ldots, P_{BLA4}$ corresponding to the ambient light levels of 3, 12, 35, 100 lux are given by $$P_{BLA1}=P_{BLM1}\times [(N_1\times D_1+N_2\times D_2+\ldots N_{10}\times D_{10})/(N_1+N_2+\ldots +N_{10})],$$

$$P_{BLA2}=P_{BLM2}\times [(N_1\times D_1+N_2\times D_2+\ldots N_{10}\times D_{10})/(N_1+N_2+\ldots +N_{10})],$$

$$P_{BLA3}=P_{BLM3}\times [(N_1\times D_1+N_2\times D_2+\ldots N_{10}\times D_{10})/(N_1+N_2+\ldots +N_{10})],$$

$$P_{BLA4}=P_{BLM4}\times [(N_1\times D_1+N_2\times D_2+\ldots N_{10}\times D_{10})/(N_1+N_2+\ldots +N_{10})],$$

where $N_1\times D_1+N_2\times D_2+\ldots +N_{10}\times D_{10}=2\times 50\%+7\times 60\%+65\times 70\%+149\times 80\%+176\times 90\%+129\times 100\%+60\times 100\%+18\times 100\%+7\times 100\%+3\times 100\%$, and $N_1+N_2+\ldots +N_{10}=k=616$.

Figure 3:
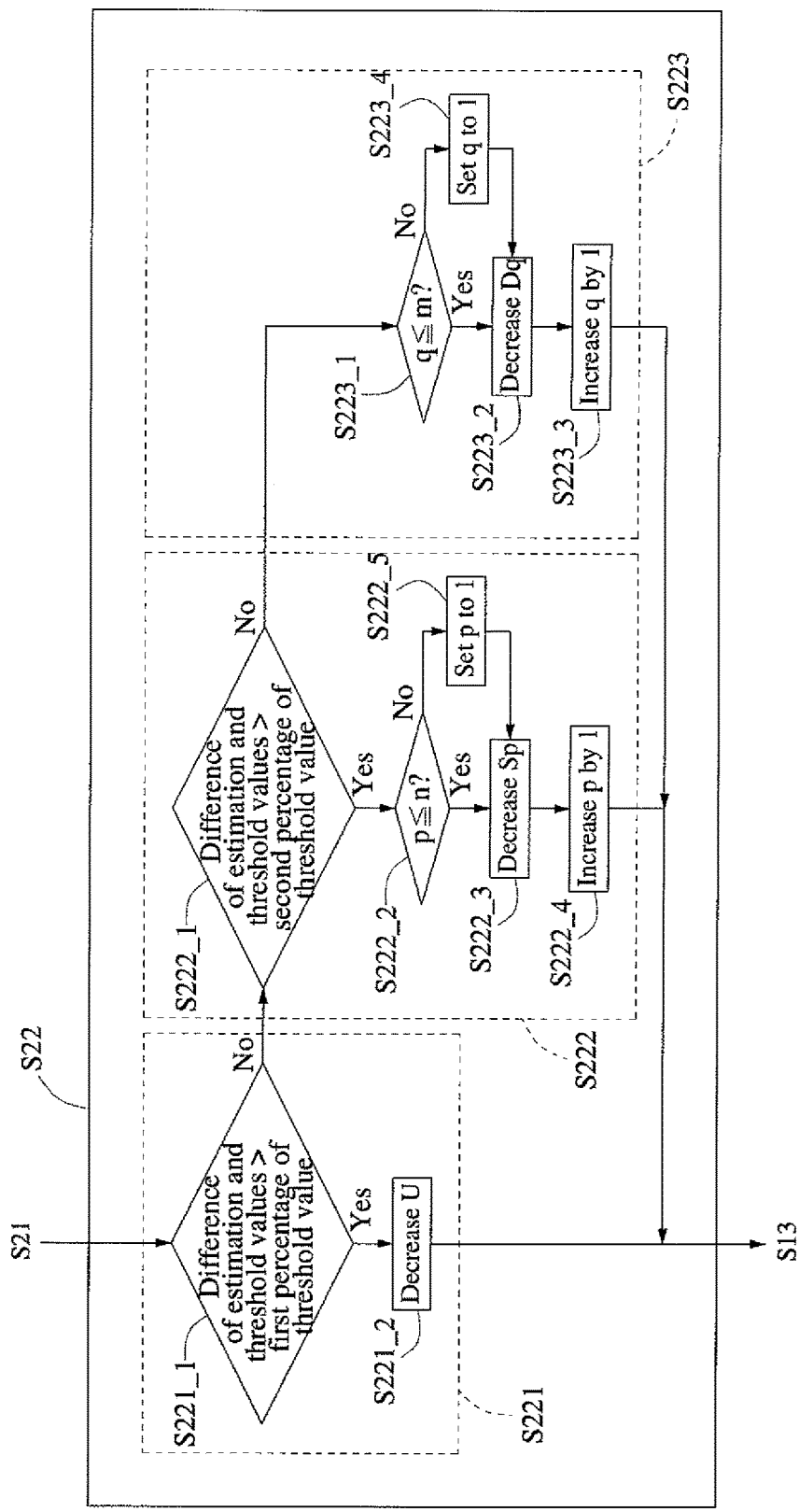
FIG. 3 is a flowchart of adjusting a turn-on preset brightness value, first brightness adjustment ratios, and/or second brightness adjustment ratios according to an embodiment of the present invention.

Please refer to FIG. 1 and FIG. 3. FIG. 3 is a flowchart of the step S22 shown in FIG. 1 (i.e. adjusting the turn-on preset brightness value, the first brightness adjustment ratios, and/or the second brightness adjustment ratios) according to an embodiment of the present invention. It should be noted that the prerequisite of executing the step S22 is the estimation value ($P_{ON_E}$) greater than or equal to the threshold value. In the embodiment, when the estimation program start executing at the step S11 shown in FIG. 1, the estimation program initializes parameters, etc., in the meantime it sets p, q to 1. But the embodiment is not limited to the present invention. The estimation program may set p, q to 1 just before the step S13 shown in FIG. 1, for example, it may set p, q to 1 after the step S12 is completed and before the step S13 is executed. Why it needs to set p, q to 1 before the step S13 will be described in detail afterwards.

In the embodiment, the step S22 includes steps S221 to S223 which determine which parameter needs to be adjusted according to the difference of the estimation value and the threshold value. The adjustment of the turn-on preset brightness value U has the greatest influence on the estimation value; the adjustment of the n first brightness adjustment ratios $S_1, S_2, \ldots, S_n$ has less influence on the estimation value; the adjustment of the m second brightness adjustment ratios $D_1, D_2, \ldots, D_m$ has the least influence on the estimation value. When the difference of the estimation value and the threshold value is greater than a first percentage of the threshold value, meaning that there is a big difference, it executes the step S221 to decrease the turn-on preset brightness value U to quickly cause the estimation value to become small. When the difference of the estimation value and the threshold value is less than or equal to the first percentage of the threshold value and greater than a second percentage of the threshold value, meaning that there is a moderate difference, it executes the step S222 to decrease the n first brightness adjustment ratios $S_1, S_2, \ldots, S_n$. When the difference of the estimation value and the threshold value is less than or equal to the second percentage of the threshold value, meaning that there is a small difference, it executes the step S223 to decrease the m second brightness adjustment ratios $D_1, D_2, \ldots, D_m$. When the step S221, S222, or S223 is completed, i.e. the step S22 is completed, it returns to the step S13 to calculate a new estimation value by executing the steps S13 to S15. If the new estimation value is still greater than or equal to the threshold value, it executes the step S22 again. In an embodiment, the first percentage is 30%, and the second percentage is 10%. When the difference is greater than 30% of the threshold value, it executes the step S221; when the difference is 10% to 30% of the threshold value, it executes the step S222; when the difference is less than 10% of the threshold value, it executes the step S223.

In the embodiment, the step S221 includes steps S221_1 and S221_2; the step S222 includes steps S222_1 to S222_5; the step S223 includes steps S223_1 to S223_4. At the step S221_1, the estimation program determines whether the difference of the estimation value and the threshold value is greater than the first percentage of the threshold value, if yes, it executes the step S221_2; if no, it executes the step S222_1. At the step S221_2, it means that the difference of the estimation value and the threshold value is greater than the first percentage of the threshold value (e.g. the difference is greater than 30% of the threshold value), so it decreases the turn-on preset brightness value U by a first minimum adjustment unit, and then returns to the step S13, where the first minimum adjustment unit is, for example, 1%. At the step S222_1, the estimation program determines whether the difference of the estimation value and the threshold value is greater than the second percentage of the threshold value, if yes, it executes the step S222_2; if no, it executes the step S223_1.

At the step S222_2, it means that the difference of the estimation value and the threshold value is less than or equal to the first percentage of the threshold value and greater than the second percentage of the threshold value (e.g. the difference is 10% to 30% of the threshold value), so it determines whether p is less than or equal to n to determine whether the previously adjusted first brightness adjustment ratio is $S_n$. If at the step S222_2 it determines that p is less than or equal to n, meaning that the previously adjusted first brightness adjustment ratio is not $S_n$, it executes the step S222_3 to decrease the first brightness adjustment ratio $S_p$ by a second minimum adjustment unit, then executes the step S222_4 to increase p by 1, and then returns to the step S13, where the second minimum adjustment unit is, for example, 10%. If at the step S222_2 it determines that p is greater than n, meaning that the previously adjusted first brightness adjustment ratio is $S_n$, it executes the step S222_5 to set p to 1, and then executes the step S222_3.

At the step S223_1, it means that the difference of the estimation value and the threshold value is less than or equal to the second percentage of the threshold value (e.g. the difference is less than 10% of the threshold value), so it determines whether q is less than or equal to m to determine whether the previously adjusted second brightness adjustment ratio is $D_m$. If at the step S223_1 it determines that q is less than or equal to m, meaning that the previously adjusted second brightness adjustment ratio is not $D_m$, it executes the step S223_2 to decrease the second brightness adjustment ratio $D_q$ by a third minimum adjustment unit, then executes the step S223_3 to increase q by 1, and then returns to the step S13, where the third minimum adjustment unit is, for example, 10%. If at the step S223_1 it determines that q is greater than m, meaning that the previously adjusted second brightness adjustment ratio is $D_m$, it executes the step S223_4 to set q to 1, and then executes the step S223_2.

It should be noted that, by the steps S221_1 and S222_1, every time the step S22 is executed, only one of the steps S221, S222, and S223 is executed. By the steps S222_2 to S222_5, every time the step S222 is executed, only some first brightness adjustment ratio $S_p$ is decreased by the second minimum adjustment unit; moreover, by setting p to 1 before the step S13 and at the step S222_5, the first brightness adjustment ratios are adjusted in the order of $\ldots, S_1, S_2, \ldots, S_n, S_1, S_2, \ldots, S_n, S_1, S_2, \ldots$ to maintain $S_1 \leq S_2 \leq \ldots \leq S_n$. By the steps S223_1 to S223_4, every time the step S223 is executed, only some second brightness adjustment ratio $D_q$ is decreased by the third minimum adjustment unit moreover, by setting q to 1 before the step S13 and at the step S223_4, the second brightness adjustment ratios are adjusted in the order of $\ldots, D_1, D_2, \ldots, D_m, D_1, D_2, \ldots, D_m, D_1, D_2, \ldots$ to maintain $D_1 \leq D_2 \leq \ldots \leq D_m$. By repeatedly executing the steps S13, S14, S15, and S21 shown in FIG. 1, and the step S22 shown in, the estimation program may automatically adjust the turn-on preset brightness value, the first brightness adjustment ratios, and/or the second brightness adjustment ratios to cause the estimation value to be less than the threshold value.

Although the present invention has been described in terms of the preferred embodiments, it is not limited thereto. It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A method for testing energy efficiency of a display device, the display device having an automatic brightness control function and a local dimming function, the method comprising the following steps:

S1: executing an estimation program to obtain an estimation value of an on-mode average power consumption of the display device, comprising the following steps:

S11: analyzing contents of a test video to obtain an average-pixel-value histogram of a plurality of frames of the test video in a test time, the average-pixel-value histogram comprising a plurality of average-pixel-value bins, the plurality of frames being categorized into the plurality of average-pixel-value bins according to their respective average pixel values, so that the plurality of average-pixel-value bins correspond to a plurality of frame numbers respectively;

S12: setting a turn-on preset brightness value, a plurality of first brightness adjustment ratios corresponding to a plurality of ambient light levels, and a plurality of second brightness adjustment ratios corresponding to the plurality of average-pixel-value bins of the display device;

S13: according to a rated backlight power consumption value, the turn-on preset brightness value, and the plurality of first brightness adjustment ratios of the display device, calculating a plurality of maximum backlight power consumption values corresponding to the plurality of ambient light levels;

S14: according to the plurality of maximum backlight power consumption values, the plurality of frame numbers, and the plurality of second brightness adjustment ratios, calculating a plurality of average backlight power consumption values corresponding to the plurality of ambient light levels; and S15: according to an average value of the plurality of average backlight power consumption values, and a rated motherboard power consumption value of the display device, calculating the estimation value;

S2: when the estimation value is greater than or equal to a threshold value, adjusting the turn-on preset brightness value, the plurality of first brightness adjustment ratios, and/or the plurality of second brightness adjustment ratios to cause the estimation value to be less than the threshold value; and S3: when the estimation value is less than the threshold value, actually measuring the display device to obtain a measurement value of the on-mode average power consumption of the display device.

2. The method of claim 1, further comprising the following step:

S4: when the measurement value is greater than a requirement value of the on-mode average power consumption of the display device, adjusting the turn-on preset brightness value, the plurality of first brightness adjustment ratios, and/or the plurality of second brightness adjustment ratios to cause the measurement value to be less than or equal to the requirement value.

3. The method of claim 1, wherein at the step S13, assuming that the rated backlight power consumption value is $P_{BL}$, the turn-on preset brightness value is U, and the plurality of first brightness adjustment ratios are $S_1$, $S_2$, ..., $S_n$, the plurality of maximum backlight power consumption values are $P_{BLM1}$, $P_{BLM2}$, ..., $P_{BLMn}$, and $P_{BLMi}=P_{BL} \times U \times S_i$, wherein n is a positive integer, U, $S_1$, $S_2$, ..., $S_n$ each are 0 to 100%, and i is a positive integer from 1 to n.

4. The method of claim 3, wherein at the step S14, assuming that the plurality of frame numbers are $N_1$, $N_2$, ..., $N_m$, and the plurality of second brightness adjustment ratios are $D_1$, $D_2$, ..., $D_m$, the plurality of average backlight power consumption values are $P_{BLA1}$, $P_{BLA2}$, ..., $P_{BLAn}$, and $P_{BLAi}=P_{BLMi} \times [\Sigma_{j=1}^{m}(N_j \times D_j)]/\Sigma_{j=1}^{m} N_j$], wherein m is a positive integer, $N_1$, $N_2$, ..., $N_m$ are nonnegative integers, $D_1$, $D_2$, ..., $D_m$ each are 0 to 100%, and i is a positive integer from 1 to n.

5. The method of claim 4, wherein at the step S15, assuming that the rated motherboard power consumption value is $P_{MB}$, the estimation value is $P_{ON\_E}$, and $P_{ON\_E}=(P_{BLA1}+P_{BLA2}+...+P_{BLAn})/n+P_{MB}$.

6. The method of claim 5, wherein the step S2 comprises the following steps:

S21: determining whether the estimation value is greater than or equal to the threshold value, and if yes, executing step S22; if no, executing the step S3; and S22: adjusting the turn-on preset brightness value, the plurality of first brightness adjustment ratios, and/or the plurality of second brightness adjustment ratios, and then returning to the step S13.

7. The method of claim 6, before the step S13, further comprising the following step:

setting p, q to 1;

wherein the step S22 comprises the following steps:

S221: when a difference of the estimation value and the threshold value is greater than a first percentage of the threshold value, decreasing the turn-on preset brightness value by a first minimum adjustment unit, and then returning to the step S13;

S222: when the difference of the estimation value and the threshold value is less than or equal to the first percentage of the threshold value and greater than a second percentage of the threshold value, if p is less than or equal to n, decreasing the first brightness adjustment ratio $S_p$ by a second minimum adjustment unit, then increasing p by 1, and then returning to the step S13; if p is greater than n, setting p to 1, then decreasing the first brightness adjustment ratio $S_p$ by the second minimum adjustment unit, then increasing p by 1, and then returning to the step S13; and S223: when the difference of the estimation value and the threshold value is less than or equal to the second percentage of the threshold value, if q is less than or equal to m, decreasing the second brightness adjustment ratio $D_q$ by a third minimum adjustment unit, then increasing q by 1, and then returning to the step S13; if q is greater than m, setting q to 1, then decreasing the second brightness adjustment ratio $D_q$ by the third minimum adjustment unit, then increasing q by 1, and, then returning to the step S13.

8. The method of claim 1, wherein the display device comprises a television.

* * * * *